United States Patent [19]

Shore

[11] 4,310,078
[45] Jan. 12, 1982

[54] DRIVE SYSTEM, CONTROLLING BRAKING SYSTEM THEREFOR, AND SAFETY LOCK CONTROLLING BOTH

[75] Inventor: Daniel B. Shore, Niles, Ill.

[73] Assignee: International Harvester Company, Chicago, Ill.

[21] Appl. No.: 145,294

[22] Filed: May 1, 1980

[51] Int. Cl.³ ............................................. B60K 41/20
[52] U.S. Cl. .................................. 192/3 S; 192/3 M; 192/4 A; 180/6.48; 180/271; 60/486
[58] Field of Search ................ 192/1, 3 R, 3 TR, 3 S, 192/3 M, 3 N, 4 A, 13 R; 180/6.48, 6.7, 271, 286; 60/484, 486

[56] References Cited

U.S. PATENT DOCUMENTS

| | | |
|---|---|---|
| 3,400,790 | 9/1968 | Ruhl et al. |
| 3,811,020 | 5/1974 | Johnson et al. |
| 3,823,792 | 7/1974 | Dinkloh et al. |
| 3,988,893 | 11/1976 | Bojas et al. ...................... 180/6.48 X |
| 4,019,596 | 4/1977 | Crull .................................. 180/6.48 |
| 4,072,009 | 2/1978 | Daschievici et al. .............. 180/6.48 |
| 4,076,090 | 2/1978 | Krusche et al. .................... 180/6.48 |

*Primary Examiner*—George H. Krizmanich
*Attorney, Agent, or Firm*—John W. Gaines; F. David AuBuchon

[57] ABSTRACT

Hydrostatic tractor's drive and braking system, particularly one controlled, first, by a tractor safety lock lever which, when put "on," both neutralizes the engine-driven, variable ratio hydrostatic system for positively preventing drive and also sets the brakes for simultaneously positively preventing rolling and, second, by a two-stage brake pedal which is overcontrolled by the safety lock lever whenever the lever is "on" and which operates initially to intensify engine braking by increasing the hydraulically fixed ratio of the hydrostatic drive and its rate of dynamic dissipation of power, and which operates finally to neutralize drive and set brakes in an overlapping sort of way with the function of the safety lock lever and exactly the same as the safety lock lever does whenever "on."

18 Claims, 7 Drawing Figures

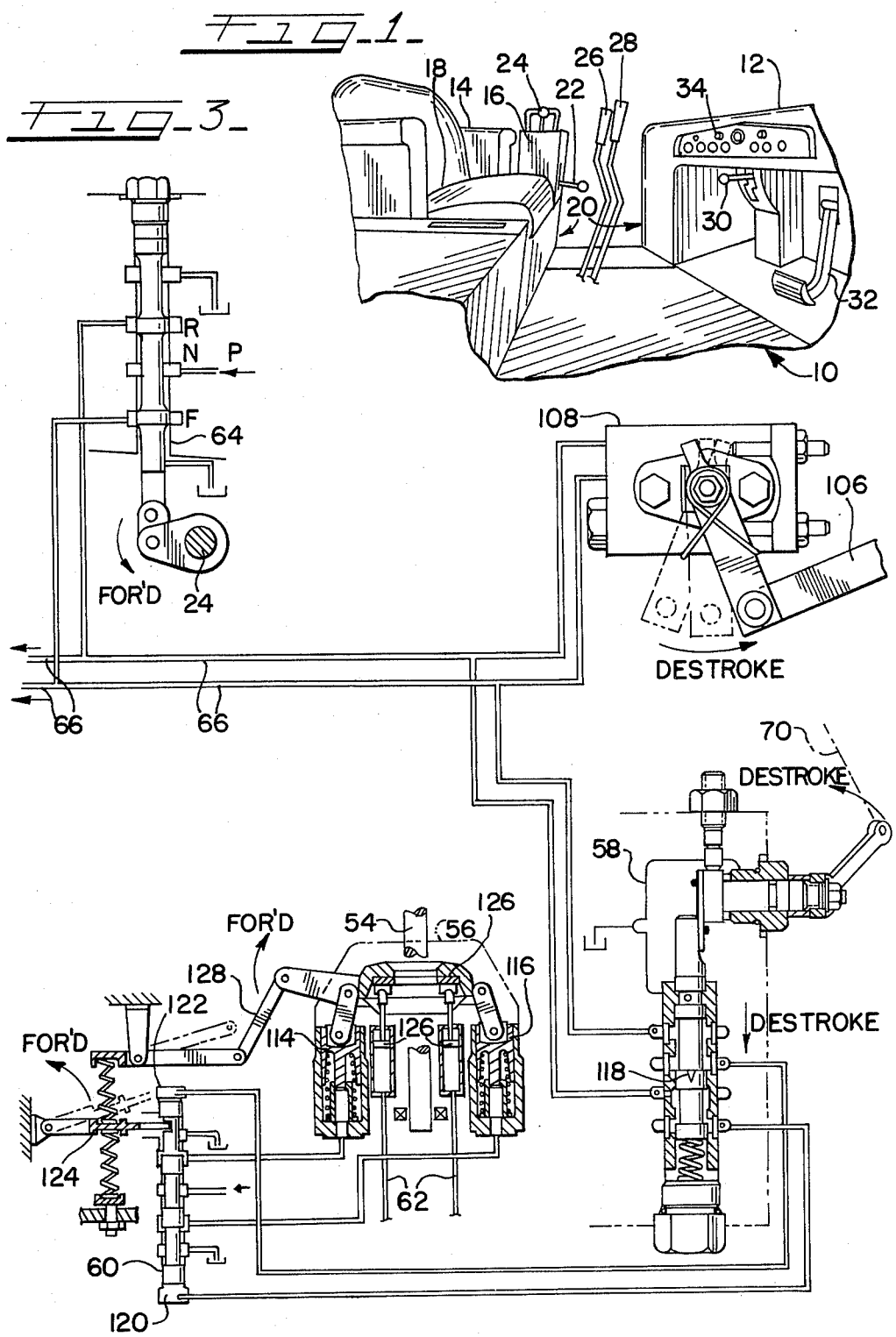

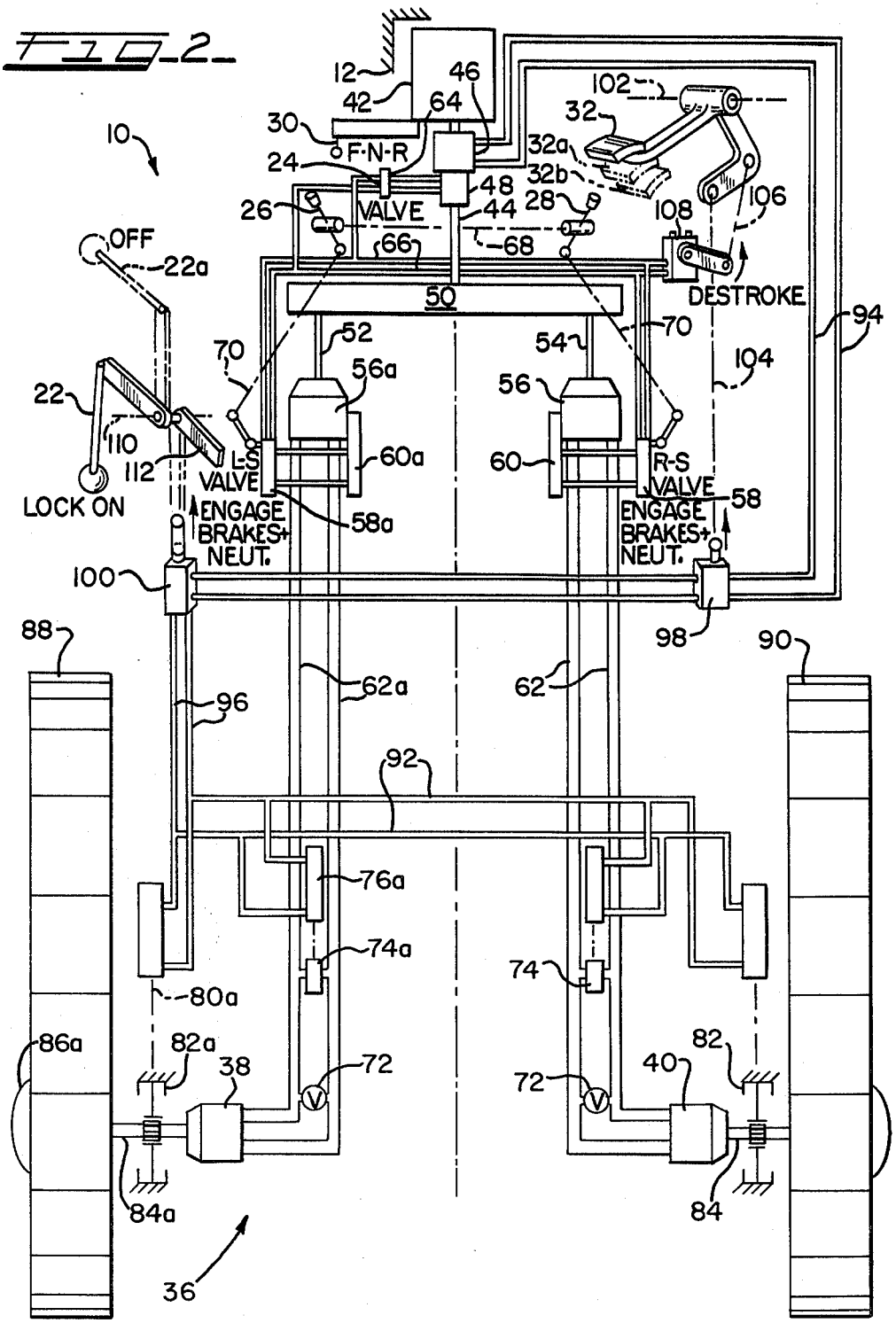

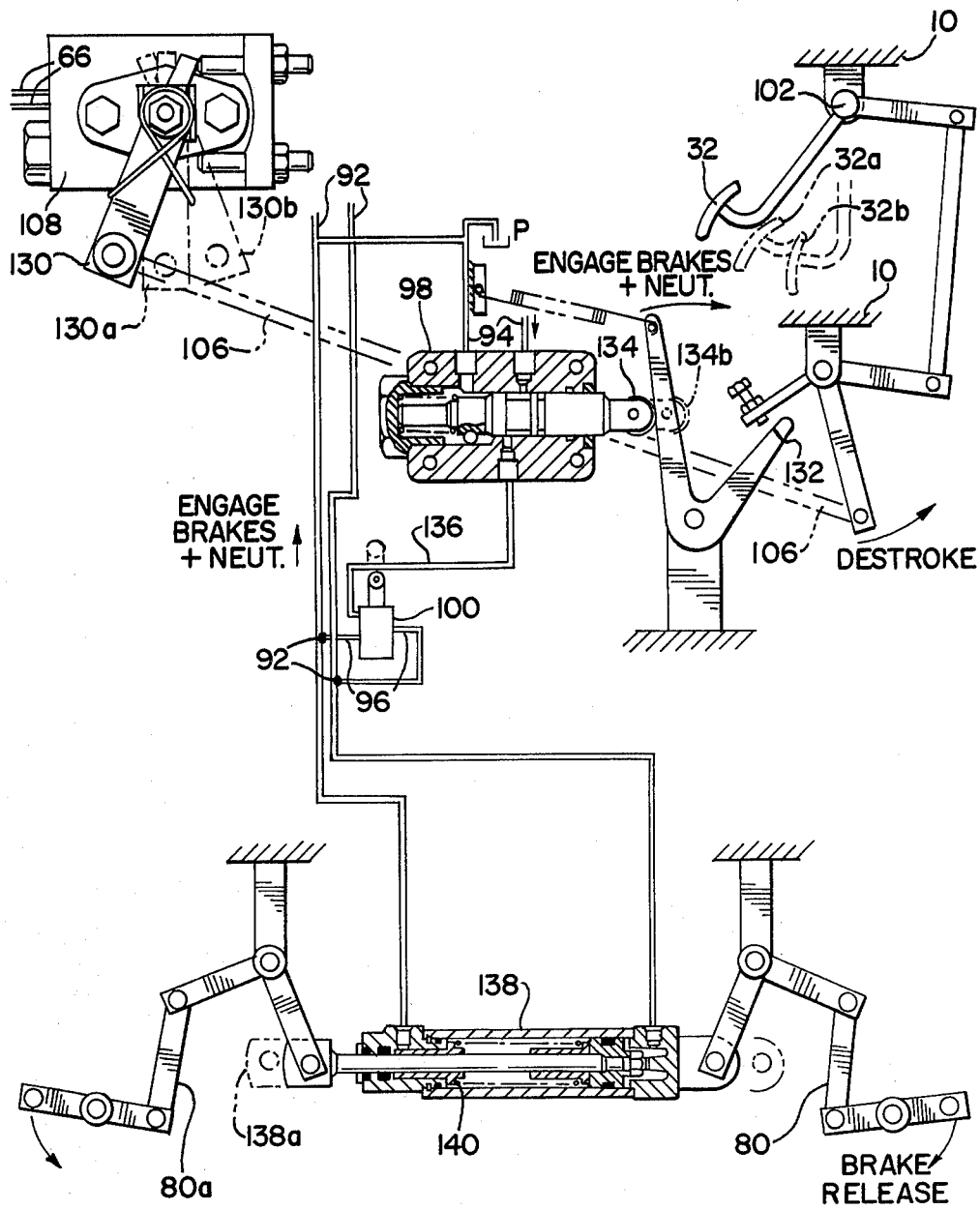

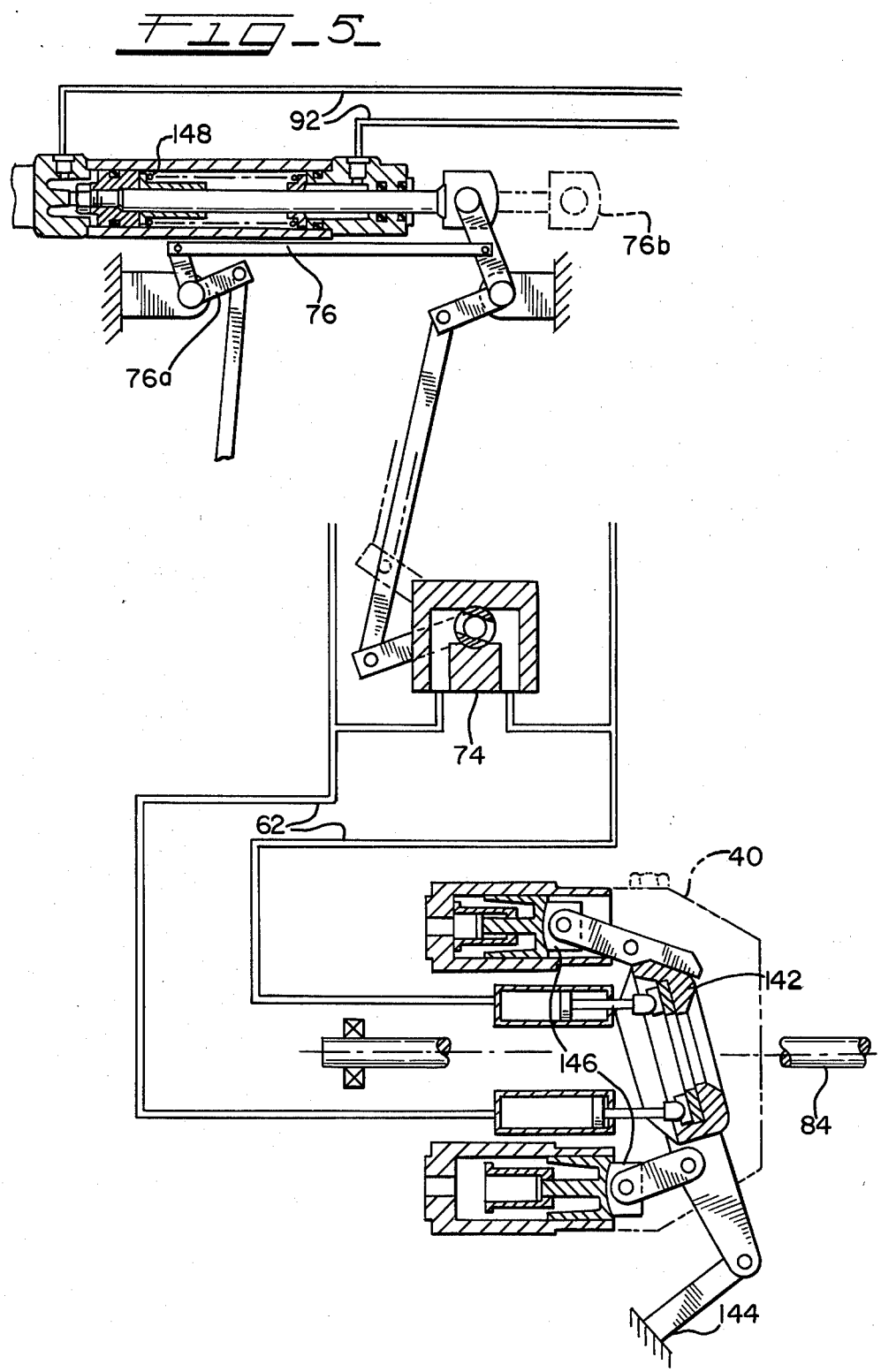
FIG_5

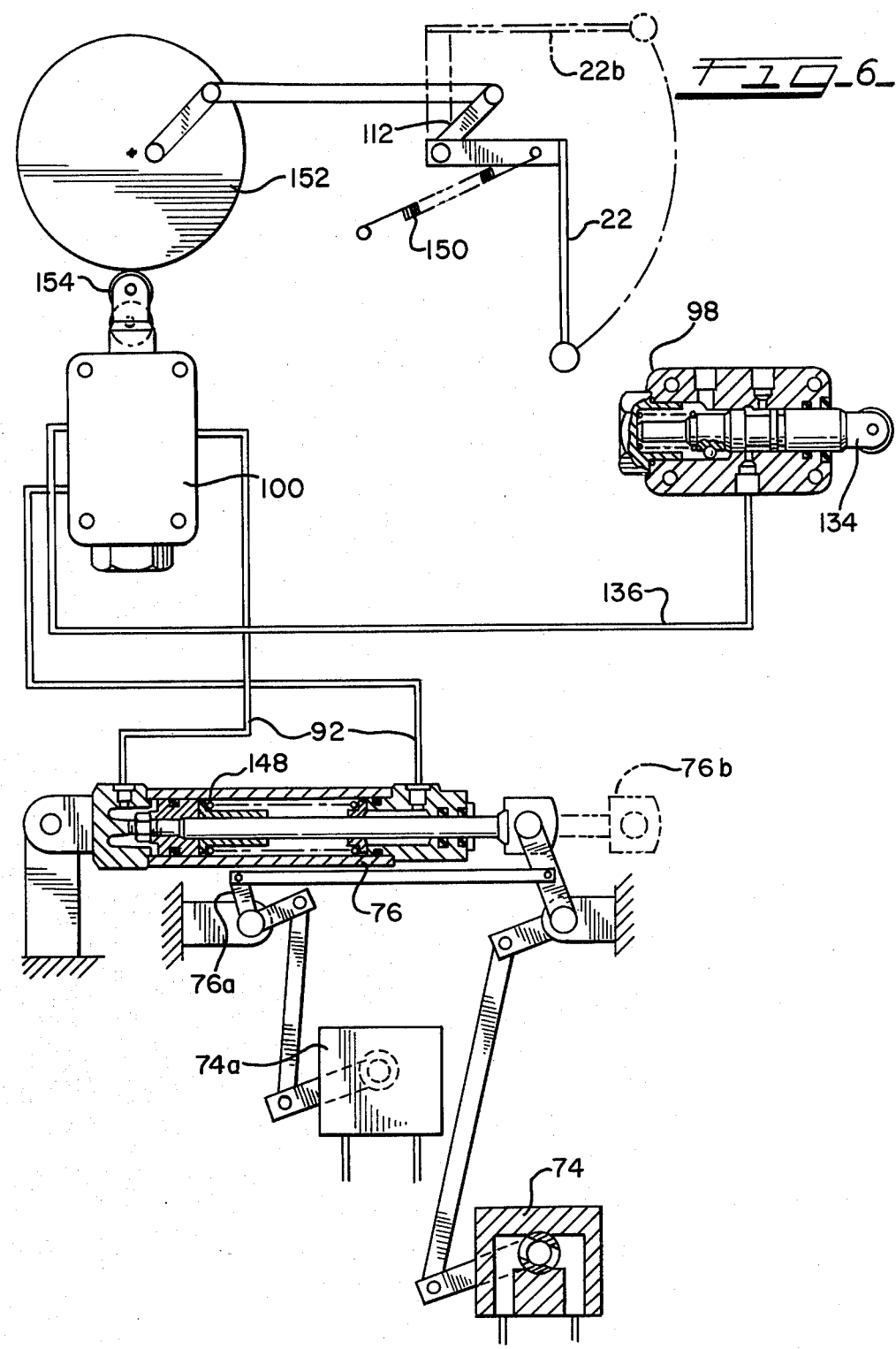
FIG_6

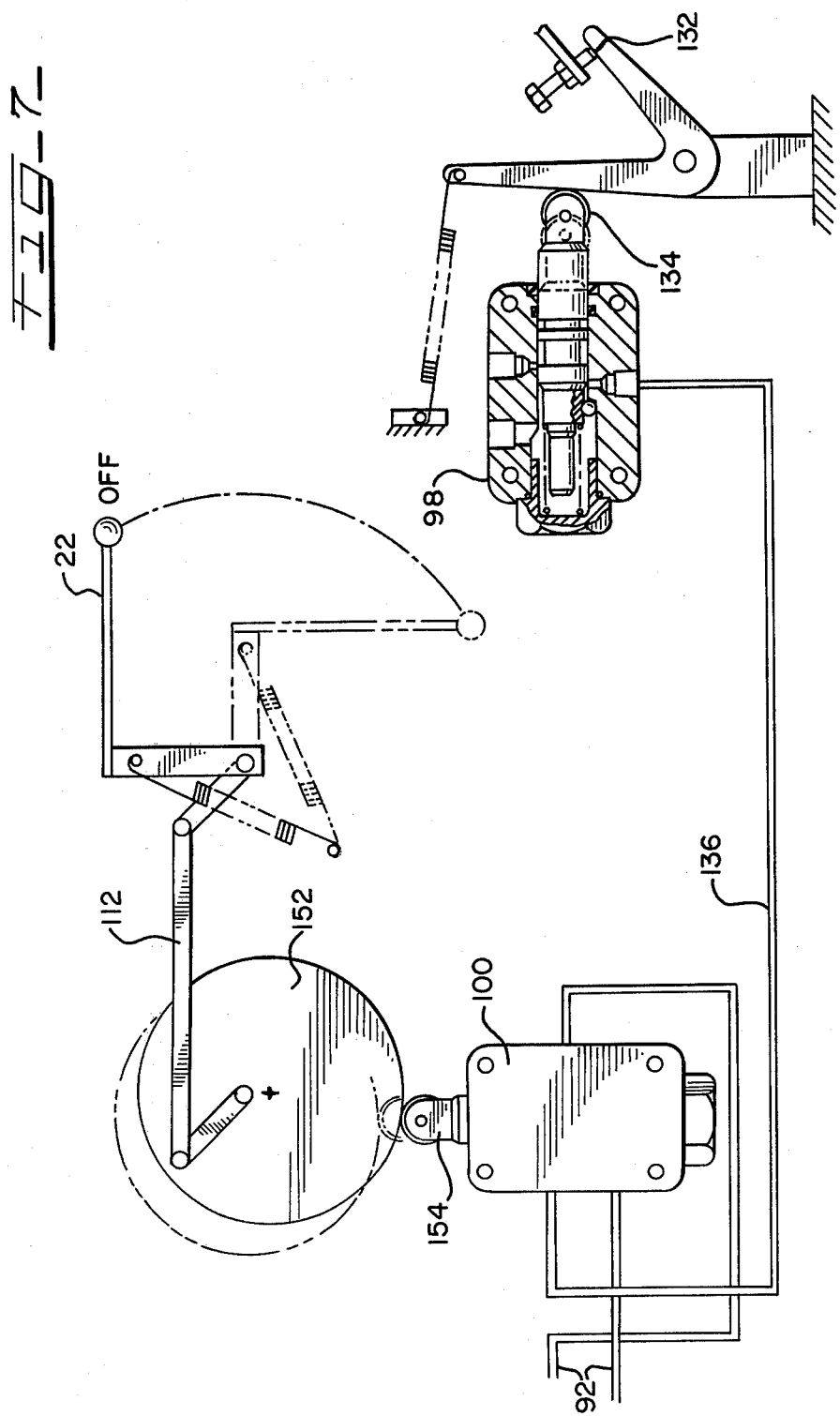

DRIVE SYSTEM, CONTROLLING BRAKING SYSTEM THEREFOR, AND SAFETY LOCK CONTROLLING BOTH

This application is a companion case to U.S. Pat. No. 3,811,020 owned by the same assignee.

My invention relates to a hydrostatic tractor's drive and braking system.

It particularly relates to control of such a tractor, first, by a tractor safety lock lever when put "on" both to neutralize the engine-driven, variable ratio hydrostatic system for positively preventing drive and also to set the brakes for simultaneously positively preventing rolling and, second, by a two-stage brake pedal which is overcontrolled by the safety lock lever whenever the lever is "on" and which operates initially to intensify engine braking by increasing the hydraulically fixed ratio of the hydrostatic drive and its rate of dynamic dissipation of power, and which operated finally to neutralize drive the set brakes in an overlapping sort of way with the function of the safety lock lever and exactly the same as the safety lock lever does whenever "on."

For whatever help it affords with the somewhat confusing terminology, the reader may note that displacing the safety lever out of the "on" position in which it stops the tractor, will advance it to an obstructing "off" position or physically blocking position which stops the operator from getting off the tractor. Having the lever in its "off" position in the way of the operator serves as a significant visible warning sign or signal that the vehicle cannot be assumed safe to be dismounted from or entered onto because it possibly can roll by coasting or under drive. Thus if the engine is to be crank started or left running, the reader must know that the safety lever is to go on so that no possibility exists of unwanted coasting, or unwanted drive by the hydrostatic transmission such as where jostling of the controls from vibration or otherwise might unexpectedly set the tractor in motion.

According to a crawler past practice, the desirability was, from some central drive component, to use it to interrelate the crawler's standard safety handle, engine, and brakes for all of the automatic cooperation that seemed feasible at the time. It was therefore the practice as shown in Ruhl power shift transmission U.S. Pat. No. 3,400,790 to have the transmission be automatically neutralized when the safety handle was elevated into its removed vertical "safety on" or stop position, and to contemporaneously automatically slow the engine to idle and set the brakes.

According to another crawler practice in the past, the desirability was, from some central control component, to use it to interrelate the engine cranking motor and power shift transmission for all of the automatic cooperation appearing feasible at the time. It was therefore the practice as exemplified by the referred to companion Johnson safety lock U.S. Pat. No. 3,811,020 to have the safety-lever-lock electrically prepare the starter circuit for ultimate cranking of the engine at the same time when the lock was automatically resetting the power shift transmission into a forced neutral position in which it was held locked thereby.

In accordance with the further past practice in connection with a tandem connected towing unit and trailer vehicle of the articulated type, the desire was to keep the traction driving, hydrostatic trailer from any tendency of overtraveling or bunching up with respect to the hydrostatic towing unit thereahead when the towing unit was "motoring," i.e., being pumped by the ground wheels as a motor attempting to drive the vehicle engine and therefore dissipating energy and acting as a dynamic brake. It was therefore the practice, as illustrative U.S. Pat. No. 3,823,792 shows, to provide the vehicle, having such a stepless drive in front and rear, with rear auxiliary friction brakes to augment the drag force on the trailer during braking.

My invention especially relates to a crawler tractor known as a hydrostatic crawler. It is an object thereof to consolidate elements of the crawler into certain interrelationships unique to the needs of the hydrostatic crawler and not served by the foregoing patent disclosures, and into other interrelationships needed of more general application than solely to the hydrostatic crawler, and again not served by the foregoing patent disclosures.

Further objects, features, and advantages will either be specifically pointed out or become apparent when, for a better understanding of my invention, reference is made to the following description, taken in conjunction with the accompanying drawings which show a preferred embodiment thereof and in which:

FIG. 1 is a perspective view of the operator's station in a crawler tractor with dual path hydrostatic drive and embodying the present invention;

FIG. 2 is a view in plan of the crawler's dual path hydrostatic drive system, its controlling braking system, and safety lock controlling both in accordance with the invention;

FIG. 3 is a view in plan, in part, of the right side of the dual path drive and showing the right steering pump and four control valves therefor;

FIG. 4 is a view in elevation, taken from the right side, of the tractor brake pedal and fail safe power brake cylinder, and three valves mechanically and/or hydraulically interconnected therewith;

FIG. 5 is a view, in top plan, in part, of the right side of the dual system and showing the right motor, the fail safe power bypass cylinder, and a motor bypass valve operated by the cylinder;

FIG. 6 is a view, in elevation taken from the right side, of the safety handle, fail safe power bypass cylinder, and four valves cooperating with and/or under control of, and/or controlled by the handle or cylinder; and FIG. 7 is similar to FIG. 6 to the extent of showing the handle and two valves, but differing because the two valves are repositioned.

One vehicle to which safety lock levers are particulary applicable is the crawler, especially one of which an upper flight of a crawler track must be negotiated by the driver is dismounting from or entering the crawler. It is obviously a hazard if such upper flight unwantedly moves while the driver is climbing across it for ingress or egress. Certainly such unexpected movement is unwanted if the driver takes a position supported by the upper flight and, while squatting or sitting thereon, attempts some adjustment or performs some makeshift operation on a running engine or to start the crawler engine. No assortment of controls is necessary to be re-set properly and coordinated properly for the safety of the driver who, in order to lock the tracks, finds everything consolidated in the one safety handle he sets "on"; that overall safety lock control by a unilever will be detailed hereinafter.

More particularly in FIG. 1 of the drawings, the intermediate upper portion of a hydrostatic crawler loader 10 is shown having a forward engine compartment 12 and, immediately therebehind, the adjacent operator's station 14. A control tower 16 is located at the operator's station to the left of the operator's seat 18.

The operator's aisleway 20 from and to the station platform constitutes a simple passage in open crawlers or constitutes the bottom of the door opening in the cab of an enclosed crawler; ingress and egress through aisleway 20 can be seen to be physically blocked by the handle of a safety lock lever 22 when raised into its obstructing, horizontal position into which the lever projects from the control tower 16 which pivotally supports the safety lock lever 22.

The safety lock lever 22 has a removed, vertically disposed, downward position, now shown, within the control tower 16 completely out of the way of the passage of the operator for reasons to be described. Also to be described will be the overcontrol exerted by the positionable safety lock lever 22 on the hydrostatic F-N-R direction valve lever 24 which is upstanding from the control tower 16, and on the respective left and right hydrostatic steering levers 26 and 28 which are pivotally supported upright forwardly of the operator's seat 18, and on the fuel governor mechanism 30 for the source of prime power for the drive located in the engine compartment 12, and on a power brake pedal 32 suspended below and to the right of the instrument panel 34 at rear of the engine compartment 12.

In turn, the suspended brake pedal 32 has an overcontrolling function which it exerts on the direction valve lever 24, fuel governor mechanism 30, and the left and right steering levers 26 and 28.

The dual path hydrostatic machinery beneath the platform of the operator's station 14 can conveniently be followed from a schematic diagram now to be described.

HYDROSTATIC LOADER SCHEMATIC—FIG. 2

For the vehicle 10's hydrostatic dual path system 36, including left and right drive motors 38 and 40 as shown in this figure, the source of prime power in engine compartment 12 is an engine 42 having a pair of tandem pumps connected in the drive line provided by the engine drive shaft 44. In practice, the pump pair comprising a front pump 46 of large capacity and a small pump 48 at the rear would preferably be operated from a splitter box, not shown, powered by the drive shaft 44.

Another splitter box 50 as actually illustrated receives its input from the engine drive shaft 44 and has a pair of pump shafts 52 and 54 in the output for driving the respective paths of the hydrostatic drive.

In the left path, which exemplifies both, a variably displacement set, hydrostatic pump 56a, controlled by a left steering valve 58a and a displacement control valve 60a, receives its mechanical input from the left pump shaft 52 and hydraulically supplies its output through a pair of service lines 62a in conventional way to the left drive motor 38.

Fluid for the displacement control valve 60a to set the stroke of the pump 56a is supplied in a path from the small pump 48, through the direction valve 64 controlled by the operator-operated lever 24, through signal lines 66 to the left steering valve 58a, thence to the displacement on the pump.

The axis 68 of the common steering lever support at the operator's station establishes the fixed axis about which the left steering lever 26 pivots in the operative relation thereof which its interconnecting linkage 70 provides with the left steering valve 58a. This linkage 70 affords to the operator infinitely adjustable control over the hydraulic signals communicated to the displacement control valve 60a.

In addition to separate relief valves 72 provided between the service lines of each of the drive motors 38 and 40, the left motor 38 by way of example is provided with a bypass valve 74a between its service lines 62a and a bypass power cylinder 76a. The cylinder 76a responds to a below-noted fail safe drain signal to open the bypass 74a.

The pedal 32 preferably does not serve for regular service braking, and is contemplated, primarily so, for dynamic braking, emergency, and ratchet released parking braking. Strictly for the latter two purposes, a left power brake linkage 80a operates a left track brake 82a which is connected on the motor drive axle 84a between the left motor 38 and planetary final drive gearing 86a for driving the left one of the loader's two endless crawler track assemblies 88 and 90 on the respective left and right sides of the loader vehicle 10.

The just noted fail safe drain signal comes from the brake cylinder lines 92 to operate the left brake linkage 80a and is supplied in a path from the large front pump 46 through upstream lines 94 and downstream lines 96, themselves interconnected by a brake valve 98 and a safety valve 100 forming the interconnection in that order, thence into the brake cylinder lines 92.

The axis 102 of the pedal support in the operator's station establishes the fixed axis about which the brake pedal 32 pivots in the operative relation thereof which its lost motion linkage 104 and interconnecting linkage 106 provide with the respective brake valve 98 and an override valve 108; the latter valve 108 is connected in a bypassing relation to the steering signal lines 66 and can thus reduce the magnitude of the steering signal.

The axis 110 of the lever support in the control tower, not shown, establishes the fixed axis about which the safety lock lever 22 pivots in the operative relation thereof which its interconnecting lock linkage 112 provides with the safety valve 100.

The vehicle 10, primarily contemplated as a front end loader of which the loader bucket and front linkage are not shown, is steered by driving. It proceeds forwardly or rearwardly along a straight line when the tracks 88 and 90 are operated at their straight tracking same speed, and turns to either side depending upon whichever track at the side is slowed down to turn to that side. Steering is very much standard for dual path hydrostatic drives and will be briefly treated as follows, primarily for the right side only of the vehicle and for the turns to that side; the right hydrostatic pump 56 will be seen to be critical.

RIGHT SIDE STEERING—FIGS. 2, 3

Simply for contrast, and not for reason of differentiating its functions which will be detailed much later hereinafter, the override valve 108 is illustrated in FIG. 2 in an ineffective home position awaiting activation, and is illustrated in FIG. 3 in its destroke overtravel position; in the latter position by overcontrol it bypasses and cancels all steering signals so that without exception the forward servo 114 and rearward servo 116 are forced to equalize in length in the right pump 56 causing it to be stroked out as illustrated in FIG. 3, i.e., having zero pumping stroke and being capable of absorbing infinite speed on the engine driven pump shaft 54 with no oil displacement.

All that is needed for a change is for the brake interconnecting linkage 106 to place the override valve 108 in the inactive position as illustrated in FIG. 2, whereupon steering will occur for right turns in the following fashion by appropriate adjustment of the right pump 56 from its position as shown in FIG. 3. When the direction and speed valve 64 is moved in the direction of its forward range as indicated by arrow, let us say to full forward, the signal lines 66 will transmit a full forward signal to the right steering valve 58. The operator-operated steering linkage 70 can appropriately modulate the full forward steering signal by motion in the destroke direction indicated by arrow, thus downwardly adjusting, as viewed in FIG. 3, a valve land having a widening V notch 118 which, proportional to its magnitude of downward displacement, reduces the full forward signal pressure.

Immediately prior to any modulation whatsoever over the full pressure of the forward signal, that signal in a forward chamber 120 of the right displacement control valve 60 would have caused a valve spool shift in the direction of a rearward chamber 122 which is at drain pressure, introducing an action and a reaction. First, by action, a double spring loaded spool recentering finger 124 will take an unsatisfied forward displaced position as shown by the broken lines and, in its own corresponding unsatisfied position, the spool of the displacement control valve 60 will operate to hydraulically start extending the forward servo 114 under pressure and hydraulically start foreshortening the rearward servo 116 under drain pressure. The swash plate 126 of right pump 56 will be tilted in a clockwise direction as viewed in FIG. 3 and therefore be held in position for full forward stroke of its ring of pump pistons 126. Due to this same clockwise swash plate movement as indicated by arrow, the mechanical followup linkage 128 by closed loop feedback will take the correspondingly full forward, angular position as shown by broken lines thus recentering the double spring loaded finger 124 and spool of valve 60 to their fully satisfied position appearing in solid lines in FIG. 3.

However, the described modulation of the full pressure steering signal will allow off center movement of the spool in the opposite unsatisfied direction, and the tilt of the swash plate 126 compared to full stroke will be less angular at the point at which the finger 124 and spool become satisfied upon recentering.

In standard way, the signal-modulated swash plate tilt and reduced pump output on the right side will reduce the forward track speed of the vehicle at the right side and cause it to go into a right turn due to the differential caused by underspeed forwardly on the right side.

A rearward signal from the direction and speed valve 64 will allow the rearward chamber 122 to predominate in pressure in displacement control valve 60, whereupon from the stroked out, flat angle position illustrated for the swash plate 126, the swash plate will be tilted for rearward drive in the opposite direction from that shown by the forward arrow in FIG. 3. So, destroking motion of the right steering valve 58 will relatively slow the right side of the vehicle as it moves rearwardly causing it to back to the right.

No matter in which direction it is being moved so as to approach the solid line neutral position as shown by solid lines for the direction and speed valve 64 in FIG. 3, the more the spool of the speed valve 64 approaches the solid line position the more will it reduce differential pressure between signal lines 66 and simultaneously reduce pump strokes on both sides of the vehicle. So if neither steering valve is being activated at the time, both tracks will be slowed down by the same amount and to the same slower speed for straight line steering.

Similarly, the override valve 108 simultaneously controls both pumps 56 and 56a to reduce displacement jointly. It is altogether controlled by the pedal linkage 106 and its destroking functions can best be understood from a consideration of the linkage 106 and the vehicle brake pedal 32 now to follow.

BRAKE PEDAL—FIG. 4

The immediately previously discussed destroke overtravel position (FIG. 3) of the override valve 108 corresponds to a broken line position as shown by the broken lines 130b for the valve lever appearing in FIG. 4. The corresponding fully depressed parking position of the brake pedal is indicated by the broken lines 32b. Release by the operator enables the pedal 32 to take the solid line released position, corresponding to which the pedal linkage 106 and valve lever 130 take their inactive position as shown in solid lines.

Upon activation of pedal 32, linkage 106, and lever 130 of the valve 108, the effect of the depressed pedal is progressive in destroking both pumps 56 and 56a, not shown, until they are stroked out by movement of pedal, linkage, and lever to their respective full destroke positions as indicated by the broken lines 32a and 130a. Therefrom, up to and including the respective destroke overtravel positions of pedal and lever as shown by the broken lines 32b and 130b, both pumps are continuously held stroked out with no fluid being pumped.

Although depression of the pedal 32 into overtravel range is without effect on the continuing overcontrolling function of override valve 108, the reaching by the pedal 32 to its full destroke position as shown by the broken lines 32a will take up all slack from a bellcrank-and-set-screw lost motion connection 132 between the brake pedal 32 and its brake valve 98 which begins to function only as a second stage operation to the previously described first stage or first arc of depression of the brake pedal. More specifically with all clearance gone in the connection 132, continuing movement of the pedal from the position 32a to the position 32b as shown by broken lines and concomitant continuing movement of the overcontrolling connection 134 from its solid line off position to the on position as shown by the broken lines 134b cause the brake valve 98 to progressively modulate its outgoing pressure signal in a brake signal line 136 down toward and including drain pressure, as the reduced pressure signal is introduced to the safety valve 100 as shown in its solid line signal transmitting, off position. So the safety valve 100 noninterferingly transmits the modulated brake valve signal through the appropriate brake cylinder line 92 into the head end of a common power brake cylinder 138.

With more pedal depression causing more modulation, the power brake cylinder 138 foreshortens from its broken line position as shown by the broken lines 138a. These decreases in the cylinder head pressure are accompanied by corresponding increases in length of the fail safe brake springs 140 with which the cylinder head pressure strikes a balance at the time at which the piston of cylinder 138 stops movement; the brakes engage to whatever partial extent is desired in slowing the vehicle's movement. Drain pressure in the head end of the cylinder 138 incident to full brake pedal depression causes the power brake cylinder to take the position as shown in solid lines in FIG. 4 wherein the left and right brake linkages 80a and 80 occupy their position as shown in solid lines fully spring applying the dual brakes 82a and 82, not shown, on the vehicle. The vehicle stops.

Opposite movement of the pedal from the broken line position 32b to the broken line position 32a will provide full release of the brakes under full brake signal pressure in the head end of the cylinder which will take its extended position as shown in broken lines by the broken lines 138a in FIG. 4.

It will be noted that the safety valve 100 in the solid line off position illustrated in FIG. 4 is signaling for full brake release, and yet the overcontrolling connection 134 on brake valve 98 enables the brake pedal 32 independently and fully through brake cylinder lines 92 to set the brakes at any time that the operator's foot so determines.

The same effects and interrelationships obtain in connection with the drive motors which are connected to the same brake cylinder lines 92, and the motor drive will now be described in that connection.

RIGHT MOTOR DRIVE—FIG. 5

A right motor 40 shown in this figure is exemplary of the motor drives of the present dual path hydrostatic drive system.

Its service line connections 62 to the right side pump, not shown, normally enable the latter through incremental adjustment and appropriate flow reversal to drive the motor 40 at all speeds up to maximum in both directions with infinite adjustability. Although a swash plate 142 in the motor 40 is shown to have a fixed linkage at 144, ordinary skill in the art will enable the hydraulically set servos which are illustrated for convenience to reduce the motor displacement from a maximum angle illustrated in solid lines to a minimum motor swash plate angle during final movement of the right steering lever into its full forward position; so the motor 40 and equally its counterpart motor 38, not shown, can be hydraulically employed in either direction of its rotation to provide an overdrive speed to the vehicle if desired as the steering levers approach their full forward positions.

The brake cylinder lines 92 discussed in the preceding section are appropriately connected to a power bypass cylinder 76 so as to communicate, under nonbraking conditions, full signal pressure into the head end of the cylinder 76 causing at the rod end the extension of the cylinder into the position as shown by the broken lines 76b in FIG. 5. The rod end acting through the valve linkage in the position as shown in broken lines closes the right motor bypass valve 74 so that the motor 40 is fully operational to be driven by the pump, not shown, or to drive as pump under the vehicle motoring conditions described.

On the other hand when the brake pedal is depressed to send a drain pressure signal through the appropriate one of the brake cylinder lines 92, a fail safe bypass spring 148 providing in the power cylinder 76 expands and collapses the latter into the position as shown in solid lines, opening the bypass valve 74 to operate as shown in solid lines completely bypassing the motor 40 by interconnecting the service lines 62 leading to and from the pump, not shown. The motor 40 during brake application is therefore incapable of being driven as a pump by the right axle 84 and, more importantly, it is inert to be driven by the pump, not shown, and there is not possibility of unwanted drive of the right track assembly, not shown, by the motor 40.

The operator exerts similar conrol over the brake cylinder lines 92 with the safety lock valve, now to be explained.

SAFETY HANDLE ON—FIG. 6

In this figure, whenever the safety lock lever 22 has the obstructing horizontal off position as shown by the broken lines 22b therein and corresponding to the same off position as shown in FIG. 1, it is held there by an overcenter spring 150 and serves as reminder preventing the operator from leaving the tractor. When the lever is removed into the control tower, not shown, by being pivoted into its downardly displaced vertical position therein as shown by the solid lines, the overcenter spring 150 holds the lever in the on condition as there assumed and with the handle down.

This on position for the lock as shown in solid lines locks the vehicle against movement; it is the so-called stop position wherein the lock linkage 112 and an eccentrically mounted circular cam disc 152 controlled thereby allow a spring loaded overcontrolling connection 154 of valve 100 to fully extend as shown and direct a drain pressure signal through the appropriate one of the brake cylinder lines 92 to the head end of the bypass cylinder 76. The unopposed fail safe spring 148 expands to end of travel, fully foreshortening the cylinder 76 for the latter to take the solid line bypass position as shown in solid lines in FIG. 6. Accordingly, the left bypass valve 74a and the right bypass valve 74 bypass their respective drive motors, not shown, for the safety purposes already described.

Thus, although the brake valve 98 is in the solid line unbraking position emitting a full pressure signal otherwise capable to leave the bypassed motors unbypassed, the extended overcontrolling connection 154 overrides the full pressure signal emitted into brake signal line 136 whereby the valve 100 in the safety-on position vents brake cylinder lines 92 to drain and forces the motors to be by-passed.

The safety off condition of the valve 100 wherein the bypass cylinder 76 extends the rod end to the fully extended cylinder position as shown by the broken lines 76b is best understood from a consideration of FIG. 7, now to be explained.

SAFETY HANDLE OFF—FIG. 7

In this figure, when raised by the handle from the broken line position into the solid line position shown, the safety lever 22 moves the lock linkage 112 so as to cause counterclockwise eccentric rotation and consequent downward displacement of the cam disc 152, thereby depressively camming the overcontrolling connection 154 and the valve 100 into their retracted safety off, operating position. So full pressure is attempted to be signaled by the valve 100 through the appropriate one of the brake cylinder lines 92 to release the spring applied brakes and to rotate the bypass valves into a closed position restoring the motors to their unbypassed condition. To do so however requires a full pressure, brake line signal in signal line 136 from the brake valve 98 and it has already been disclosed that when the valve 98 and its overcontrolling connection 134 occupy their extended on position as shown in FIG. 7 in solid lines, the dual brakes are fully set and the dual drive motors are fully bypassed; in other words, the brake valve 98 will communicate only drain pressure to the safety valve 100 which therefore has only drain pressure in its pressure line and can only submissively allow the brakes to engage and the motors to be bypassed.

In appreciating the stage of braking in which the pedal is depressed progressively through its first encountered arc of travel, for full significance assume the crawler loader, loaded or unloaded, is proceeding on a long downgrade so as to descend into a gravel pit or fill pit. Initial pedal depression into said arc would initially destroke the dual pumps for a first reduced displacement increasing the motoring and speed of the engine for the engine braking desired. The fuel governor mechanism would automatically reduce the rate of the fuel supply to the engine, requiring that the engine be motored further so that the dual pumps as driven by the drive motors would have an increased load thereon and dynamically dissipate more power. Additional pedal depression would cause additional destroking of the dual pumps for a second reduced displacement tending more toward overspeeding the underfueled engine and additionally increasing the dynamic dissipation of power and braking. Then at, and in fact somewhat before, the pedal fully destrokes the pumps so that there is zero displacement as the pumps are completely stroked out, the drive motors will at that point be forced to open the relief valves in their service lines and act as strict high pressure pumps against the very high resistance to flow of the valves thus forced open and held open.

The crawler loader at that point will be barely creeping or hardly more, whereupon appreciation can be seen as to what little more is required of the brake pedal through its second or final arc of travel. Specifically, the dual brakes are progressively applied and, at or before the time the dual brakes are fully set, the drive motors will be in full bypass.

So the crawler loader stops and is parked on grade.

Let it be assumed that the operation is over and the engine is to be stopped even though the crawler loader is on such downgrade, whereupon the driver will depress the safety lock lever 22 to the removed lock-on position just before or just after shutting down the engine.

OPERATION

At point of engine start up, from the condition just described, the positions of the direction lever 24 (FIG. 1), left and right steering levers 26 and 28, and brake pedal 32 can go unheeded by the driver, with no attendant safety hazard. At that point, if the driver notes that the safety lock lever 22 has been somehow raised to the forwardly extending position as shown in FIG. 1, he will see to lowering it by the handle so that it takes the removed lock-on position to prepare for cranking. After appropriately setting the engine fuel control 30, the driver will crank up by temporarily closing the starting circuit and thereafter resetting to high idle the fuel control adjustment after the engine is running. The driver will then swing the lever 22 forwardly to the horizontal off position, but only after seeing to it that the brake 32 has been released if in parked position and seeing to it that the direction lever 24 is in neutral.

Then by setting the direction and speed lever 24 for the proper speed and direction the driver will steer the loader off for a day's operation.

The operating cycle is then repeated after the operation is over and the engine is to be stopped, calling for the driver to depress the safety lock lever 22 to the removed, downturned lock-on position.

It is a salient feature hereof that the safety valve in its configuration as shown in FIG. 6 overcontrols the brake valve 98 for safety of the vehicle. It is also a salient feature for the brake valve 98 to overcontrol the safety valve 100 in the configuration as shown in FIG. 7 for progressively setting the dual brakes and bypassing both drive motors simultaneously.

As among two more salient features of the brake pedal hereof, the first is that, throughout its final or overtravel range between the broken line intermediate position 32a of FIGS. 2 and 4 and the broken line full travel or fully depressed position 32b of FIGS. 2 and 4, the brake pedal continuously operates through the brake valve 98 to keep both pumps stroked out; hence, there is no load on the engine so long as the friction brakes are applied. Second, the brake pedal in its initial or first arc of travel effectively overcontrols the steering levers irrespective of their inactivation or relative activation; in other words, initially depressing the undepressed brake pedal progressively initially destrokes either of the pumps of which the steering lever is unpivoted and progressively further destrokes a pump of which the steering lever is in a pivoted position. Braking thus retains the track turn ratio except at a reduced speed for making the turn. The pumps, if destroked unequally before, will be destroked by the brake pedal in the same proportion they were in before.

An additional salient feature of my invention is that either or both the safety lock lever in the applied on position and the brake pedal lever in the fully depressed overtravel position positively neutralize the motors of the transmission by full hydraulic short circuit so that no amount of malfunctioning or control displacement while the engine is running can cause the vehicle to slip into drive and start rolling under power.

As herein disclosed, the invention is shown applied to a dual path hydrostatic drive system. It is equally applicable to drive installations with a single path and with a single pump common to an oppositely disposed pair of drive motors. For drafting simplicity, the pedal travel is schematically illustrated to be about equally divided into consecutive arcs; for pedal depression in actual practice, the initial dynamic braking arc encountered will account for approximately 90 percent of total travel, the 10 percent balance occurring simply for emergency stopping of a barely creeping tractor or for parking same. That is to say, the hydrostatic drive ratio from motors to pumps during extreme dynamic braking and, finally, the opening of the motor relief valves are but two of the concluding factors forming part of a long travel, infinitely adjustable, dynamic brake action. A smooth blend of many gradations is afforded during the long travel and will avoid abruptness of response and lack of fine adjustment. So when the vehicle engine is being motored more and more drastically, the pedal-actuated dynamic braking control hereof is extremely sensitive and responsive to minor changes, including feathering through foot brake control by the operator.

Variations within the spirit and scope of the invention described are equally comprehended by the foregoing description.

What is claimed is:

1. A safety device system for a hydrostatic vehicle's drive and dual brakes, said drive comprising a prime powered dual path pump-motor hydrostatic drive including an oppositely disposed pair of hydrostatic drive motors having, at their fluid-supplied input, a bypass thereacross and arranged to be operatively connected to for bypasing the drive motors so as to provide drive in neither way between the source of prime power and the vehicle, and an oppositely disposed pair of hydrostatic pumps with hydraulic connections for normally supplying pumped fluid to the motor input, but also serving, whilst coasting so that the pumps motor their source of prime power for dynamic braking, to cause the motors to drive the pumps thereby loading the motors for dynamic dissipation of their power, said system comprising an improved safety control arrangement including:

a safety lock handle (22); and interconnections (92,96) operative from the safety lock handle to each of the dual motors (38,40) and dual brakes (82,82a) affording control of the former, in a removed, lock-on angular position, over the dualities of the latter for simultaneously bypassing both motors and applying both brakes, and affording the handle control, in a driver-obstructing lock-off angular position, over the dual pumps (56,56a), dual motors, and dual brakes for simultaneously releasing both brakes and restoring both motors to unbypassed condition so as not to interfere with both pumps in simultaneously motoring their source of prime power for dynamic braking and dissipation of power as described.

2. A safety device system for use with a self-propelled vehicle's drive and brakes (82,82a), comprising:

first means (76,76a,72) actuable to set the vehicle drive into a forced neutral setting ineffectual to provide any drive;

second means (138) actuable to unbrake or to set the vehicle brakes into forced engagement arresting motion of the vehicle and holding it stopped;

said first and second means having actuator means (94,98,100,96) common thereto;

first and second operator-operated control members comprising a pivoted pedal (32) and a pivoted safety lock (22) respectively operatively related to the actuator means; and means (102,100) supporting the first and second control members and the actuator means in their respective operative relationships described for the first member to pivot into a certain arc of pedal travel effective to neutralize the drive and brake the vehicle to a stop, and for the second member to pivot into a safety-lock-on position effective to neutralize the drive and brake the vehicle to a stop.

3. The invention of claim 2:

said first control member when unpivoted in its pedal position being normally effective to unbrake the vehicle; and an overcontrolling connection (154) on the actuator means engaged by the second member (22) in its aforementioned safety-lock-on position to overcontrol the first control member when unpivoted, and to neutralize the drive and brake the vehicle to a stop in the way described.

4. The invention of claim 2:

said drive comprising a dual path hydrostatic drive motors (38,40) with hydraulic service lines;

said first means (76,76a,72) including cylinder-operated bypass means (72) connected across said service lines, and actuable to set the dual path drive into the forced neutral setting described by hydraulically bypassing the drive motors so as to provide no drive to the vehicle.

5. The invention of claim 2:

said brakes (82,82a) comprising spring applied and fail safe, power brakes having an hydraulic power cylinder included in the second means (138);

said second means further including cylinder vent means (92,96), and actuable to set the vehicle brakes into the forced engagement described when the hydraulic power cylinder is vented to drain so that the brakes are spring applied.

6. The invention of claim 2:

said second control member comprising a pivoted safety lock lever (22) which when unpivoted physically blocks the vehicle exit for the operator, and which removes therefrom in taking its safety-lock-on position described.

7. The invention of claim 2:

said first control member comprising a pivoted brake pedal (32) effective for emergency braking and for parking braking of the vehicle.

8. The invention of claim 2:

said drive comprising a prime powered, pump pressurized; hydrostatic drive including variably displacement set, hydrostatic pump means (56,56a) having destroke actuator means to destroke the displacement;

said first control member comprising a brake pedal (32) pivoting into another, first encountered arc of travel from which the pedal overtravels into said certain arc for the neutralization and braking, the brake pedal establishing throughout said other arc cooperation with the destroke actuator means for progressively destroking the pump means as the pedal progresses into and through said other arc, thereby increasing motoring of the source of prime power and increasing load and dissipation of power by the pump means acting as a drive motor on the prime power source.

9. A two-stage pedal operated system for a hydrostatic vehicle's drive and dual brakes, said drive comprising a prime powered dual path pump-motor hydrostatic drive including a variably displacement set, pair of oppositely disposed hydrostatic pumps arranged so that, in the eventuality of being reset while motoring their source of prime power for engine braking, to be operatively connected to for destroking and taking progressively reduced displacement settings to increase load on, and the dynamic dissipation of power by, the pumps, and further including an oppositely disposed pair of hydrostatic drive motors having pump-supplied input with a bypass thereacross and arranged to be operatively connected to for bypassing the drive motors so as to provide no drive to the vehicle, said system comprising an improved pedal control arrangement including:

a brake pedal (32); and interconnections (104,106) operative from the brake pedal to each of the dual motors (76,76a), dual pumps (56,56a), and dual brakes (82,82a) affording control of the former over the dualities of the latter for destroking both pumps and simultaneously bypassing both motors and applying both brakes, and for destroking both pumps or not, without bypassing both motors and applying both brakes.

10. A two-stage system with an operator-operated member for the drive and brakes of a vehicle, to retard same to a full stop, said drive providing an engine powered, variably speed ratio set, transmission power path which, from a neutral setting when the drive is from the engine through the power path, increases the output speed of the latter from zero to maximum output speed ratio and which, from the neutral setting when the drive is motoring the engine, tends to change the speed ratio from one with no motoring of the engine to one with speed ratio increases tending to increase the motoring of the engine for more intensified enging braking, said system comprising the improvement including:

ratio means (58,58a) actuable to increase motoring of the engine and increase load on, and the dynamic braking dissipation of power by, the vehicle drive when driving the engine;

first means (76,76a,72) actuable to set the vehicle drive into a forced neutral setting ineffectual to provide any drive;

second means (138) actuable to set the vehicle brakes into forced engagement arresting motion of the vehicle and holding it stopped;

said first and second means having actuator means (94,98,100,96) common thereto;

said actuable ratio means having ratio actuator means (108) to change the speed ratio and intensity of engine motoring;

an operator-operated member (32) operatively related to the common actuator means and to the ratio actuator means; and means (102) supporting the member and the common actuator means and ratio actuator means in the operative relationship described for the member selectively in a first stage to increase the speed ratio (108) and motoring of the engine for more intensified engine dynamic braking, and in a second stage to neutralize (98) the drive and brake the vehicle to a full stop.

11. A two-stage, brake pedal operated system for a hydrostatic vehicle's drive and brakes, said drive comprising a prime powered hydrostatic drive including a variably displacement set hydrostatic pump means, said pump means having destroke means actuable to destroke said pump means for reduced displacement so as to increase motoring of the source of prime power and increase load on and the dynamic braking dissipation of power by the pump means when acting as drive motor on the prime power source, said system comprising the improvement of:

first means (76,76a,76) actuable to set the vehicle drive into a forced neutral setting ineffectual to provide any drive;

second means (138) actuable to unbrake or to set the vehicle brakes into forced engagement arresting motion of the vehicle and holding it stopped;

said first and second means having actuator means (94,98,100,96) common thereto;

said destroke means having destroke actuator means (108);

operator-operated control member means comprising a pivoted brake pedal (32) operatively related to the common actuator and the destroke actuator means; and means (102) supporting the brake pedal and the common actuator and destroke means in the operative relationship described for the brake pedal as it pivots to progressively destroke the pump means for intensifying dynamic braking as the pedal progresses into and through a first encountered arc of travel (32–32a), and to neutralize the drive and brake the vehicle to a stop as the pedal overtravels into a certain arc (32a–32b) of travel.

12. The invention of claim 11:

said operator-operated control member means further comprising a pivoted safety lock (22) likewise operatively related to the common actuator means; and means (110) supporting the lock and common actuator means in the operative relationship described for the safety lock to pivot into a safety-lock-on position effective to neutralize the drive and brake the vehicle to a stop.

13. The invention of claim 12:

said pedal when unpivoted in its pedal position normally effective to unbrake the vehicle and said lock when unpivoted normally effective to unbrake the vehicle; and overcontrolling connections (134,154) on the common actuator means enabling either pedal or lock, when the other is so unpivoted for causing unbraking, to overcontrol the latter and neutralize the drive and brake the vehicle to a stop in the way described.

14. The invention of claim 12, wherein the operator can exit from the vehicle:

said lock comprising a pivoted safety lock lever (22) which, when unpivoted, physically blocks the vehicle exit for the operator, and which removes therefrom in taking its safety-lock-on position described.

15. A steering and braking system for use with a self-propelled vehicle's drive, said drive comprising a prime-powered dual path pump-motor hydrostatic drive including a variably displacement set pair of hydrostatic pumps disposed on opposite sides of the vehicle, said system comprising the improvement of:

first means (108) actuable to destroke the displacement of both pumps and so actuable for destroking them during motoring of the source of prime power by the pumps acting as motors on the former for dynamic braking of the vehicle on both sides;

a pair of means (58,58a) actuable to destroke the displacement of different ones of the pumps and so actuable for destroking either one during motoring of the source of prime power by that one on the former for dynamic braking of the vehicle at the one side concerned;

operator-operated pivoted control members comprising a brake pedal (32) operatively related to the first means and a pair of left and right steering levers (26,28) each separately operatively related to a different one of the pair of means;

means (68) supporting the pairs of means and steering levers in the operative relationship described for the right lever to move from unpivoted to a pivoted position to progressively destroke the pump at one side of the vehicle for intensifying its efforts to motor the prime power source and for intensifying dynamic braking at that side, and for the left lever to pivotally move to progressively destroke the pump at the other side for likewise intensifying its efforts to motor the prime power source and for intensifying dynamic braking but at said other side; and means (102) supporting the brake pedal and first means in the operative relationship described for the brake pedal to pivot from an unpivoted position concurrently to progressively initially destroke either of the pumps of which the steering lever is unpivoted and to progressively further destroke a pump of which the steering lever is in pivoted position so as to dynamically brake at both sides with more intensity but in the same proportion to one another as they had before.

16. Method of retarding, to a full stop, a vehicle with stepless drive and friction braking force, said drive comprising a fuel-powered, prime power source driven, pump-motor hydrostatic drive including an oppositely disposed pair of hydrostatic drive motors having, at their fluid-supplied input, relief valve means and also a bypass thereacross and arranged to be operatively connected to for bypassing the drive motors so as to provide drive in neither way between the fuel-powered source of prime power and the vehicle, and variably displacement set hydrostatic pump means with hydraulic connections for normally supplying pumped fluid to the motor inputs but also serving, whilst coasting so that the pump means motors its source of prime power, to cause the motors to drive the pump means thereby loading the motors for dynamic dissipation of their power, said method comprising the improved steps of:
- initially (32-32a) destroking said pump means for a first reduced displacement increasing motoring of the source of prime power and increasing load on, and the dynamic dissipation of power by the pump means when acting as a drive motor on, its prime power source;
- reducing (30) the rate of fuel supply to the prime power source and increasing load on the pump means;
- further destroking (32-32a) said pump means for a second reduced displacement tending toward overspeeding the underfueled power source and further increasing load on, and the dynamic dissipation of power by the pump means;
- additionally destroking (32a) the pump means to zero displacement relegating the motors to force open the relief valve means and pump against the valve's resistance to flow in the dynamic dissipation of power; and
- bypassing (32b) the motors and friction braking the vehicle into reaching and maintaining the full stop desired.

17. Method of retarding and stopping a vehicle with stepless drive and friction braking force, said drive comprising a fueled-engine-driven, pump-motor hydraulic transmission including an oppositely disposed pair of hydrostatic drive motors having, at their fluid supplied inputs, a bypass thereacross arranged to be operatively connected to for bypassing the drive motors so that the transmission is neutralized to provide drive in neither way between the fueled engine and the vehicle, and variably displacement set, destrokable hydrostatic pump means with hydraulic connections for normally supplying pumped fluid to the motor inputs but also serving, whilst coasting so that the pump means motors its fueled engine, to cause the motors to drive the pump means thereby loading the motors for dynamic dissipation of their power, said method comprising the improved steps of:
- dynamically braking (32-32a) the vehicle to a crawl by at least partially reducing pump displacement;
- bypassing (32b) the motors to neutralize the hydraulic transmission and prevent drive under power;
- destroking (32-32b) the pump means to unload the engine; and
- friction braking (32b) the vehicle into reaching and maintaining a full stop.

18. A two-stage pedal operated system for a vehicle with stepless drive and a dual-brakes, friction braking force, said drive comprising a fueled-engine-driven, pump-motor hydraulic transmission including an oppositely disposed pair of hydrostatic drive motors having, at their fluid supplied inputs, a bypass thereacross arranged to be operatively connected to for bypassing the drive motors so that the transmission is neutralized to provide drive in neither way between the fueled engine and the vehicle, and variably displacement set, destrokable hydrostatic pump means with hydraulic connections for normally supplying pumped fluid to the motor inputs but also serving, whilst coasting so that the pump means motors its engine, to cause the motors to drive the pump means thereby loading the motors for dynamic dissipation of their power, said system comprising an improved pedal control arrangement including:
- an operator-operated control pedal (32); and
- interconnections between each of the motor bypass, the destrokable pump means variable displacement setting, and the vehicle brakes, respectively, and said operator-operated control pedal, establishing cooperation with the latter so that there is afforded effectively thereto a first position dynamically braking (32-32a) the vehicle to a crawl by at least partially reducing pump displacement, a second position (32a-32b) friction braking so as to exert at least a friction brake drag on the vehicle, and a third position (32b) friction braking the vehicle into reaching and maintaining a full stop, and bypassing the motors to neutralize the hydraulic transmission and prevent drive under power; said pedal in said second and third positions holding the pump means destroked, thus maintaining the engine unloaded.

\* \* \* \* \*